(12) United States Patent
Inoue

(10) Patent No.: US 7,691,319 B2
(45) Date of Patent: Apr. 6, 2010

(54) METHOD OF MANUFACTURING POROUS BODY

(75) Inventor: Katsuhiro Inoue, Awa-gun (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 523 days.

(21) Appl. No.: 11/516,560

(22) Filed: Sep. 7, 2006

(65) Prior Publication Data

US 2007/0063397 A1 Mar. 22, 2007

(30) Foreign Application Priority Data

Sep. 21, 2005 (JP) ............................. 2005-274502

(51) Int. Cl.
*B28B 3/20* (2006.01)
(52) U.S. Cl. ..................................... 264/630
(58) Field of Classification Search .................. 264/630
See application file for complete search history.

(56) References Cited

U.S. PATENT DOCUMENTS

| | | | |
|---|---|---|---|
| 7,250,384 B2 * | 7/2007 | Morimoto et al. ........... 501/119 |
| 7,473,464 B2 * | 1/2009 | Morimoto et al. ......... 428/305.5 |
| 2005/0101479 A1 * | 5/2005 | Morimoto et al. ........... 502/263 |
| 2005/0143255 A1 * | 6/2005 | Morimoto et al. ........... 502/178 |
| 2006/0064957 A1 * | 3/2006 | Ogunwumi et al. ........... 55/523 |
| 2007/0227109 A1 * | 10/2007 | Hong et al. ................... 55/523 |
| 2007/0277431 A1 * | 12/2007 | Ohno et al. .................... 44/358 |

FOREIGN PATENT DOCUMENTS

| | | |
|---|---|---|
| JP | 03-008757 | 1/1991 |
| JP | 2005-087797 | 4/2005 |
| WO | WO 03/082771 | * 10/2003 |

* cited by examiner

*Primary Examiner*—Steven P Griffin
*Assistant Examiner*—Russell J Kemmerle, III
(74) *Attorney, Agent, or Firm*—Burr & Brown

(57) ABSTRACT

A method of manufacturing a porous body having a high open porosity and a small thermal expansion coefficient is provided. In the manufacturing method, a raw material including an aluminum source and a titanium source is fired to obtain the porous body containing aluminum titanate as a main component, and inorganic microballoons containing an aluminum component and/or a silicon component are used as a pore former.

1 Claim, 1 Drawing Sheet

METHOD OF MANUFACTURING POROUS BODY

BACKGROUND OF THE INVENTION

1. Field of the Invention

The present invention relates to a method of manufacturing a porous body which contains aluminum titanate as a main component.

2. Description of the Related Art

Since aluminum titanate has a low thermal expansivity, excellent thermal shock resistance and a high melting point, it is used as a porous material for use in a catalyst carrier for treatment of an exhaust gas of an automobile, a diesel particulate filter or the like. Therefore, various materials containing aluminum titanate have been developed.

For example, there is proposed an aluminum titanate and mullite based porous material having a predetermined chemical composition for the purpose of improving thermal cycle durability in a case where an aluminum titanate based material is used as a honeycomb catalyst carrier for a catalytic converter (see Patent Document 1).

Moreover, it is disclosed that, in a case where the material containing aluminum titanate as the main component is used in the catalyst carrier for the treatment of the exhaust gas, the filter or the like, a pore former is generally added to a raw material to enhance porosity. Suitable examples of the pore former used in the case where a honeycomb carrier made of aluminum titanate is manufactured are known to include active carbon, coke, polyethylene resin, starch, graphite or the like (see Patent Document 2).

[Patent Document 1] Japanese Patent Application Laid-Open No. 3-8757

[Patent Document 2] Japanese Patent Application Laid-Open No. 2005-87797

SUMMARY OF THE INVENTION

The present invention provides a method of manufacturing a porous body having a high open porosity and a small thermal expansion coefficient and which is suitable for use in a catalyst carrier, a filter or the like.

The present invention provides the following method of manufacturing a porous body.

According to a first aspect of the present invention, a method of manufacturing a porous body is provided, comprising the steps of firing a raw material including an aluminum source and a titanium source to obtain a porous body containing aluminum titanate as a main component, wherein the raw material further includes inorganic microballoons containing an aluminum component and/or a silicon component.

According to a second aspect of the present invention, the method of manufacturing the porous body according to the first aspect is provided, wherein the total content of the aluminum component and the silicon component in the inorganic microballoons is 90 mass % or more in terms of $Al_2O_3$ and $SiO_2$, respectively.

According to a third aspect of the present invention, the method of manufacturing the porous body according to the first or second aspects is provided, wherein the inorganic microballoons contain a sodium component and/or a potassium component, and the total content of the sodium component and the potassium component in the microballoons is 0.5 mass % or more and 8.0 mass % or less in terms of $Na_2O$ and $K_2O$, respectively.

According to a fourth aspect of the present invention, the method of manufacturing the porous body according to any one of the above aspects is provided, wherein a melting point of the microballoons is 1100° C. or more.

According to the method of manufacturing the porous body in the present invention, since the porous body containing aluminum titanate as the main component is manufactured using the inorganic microballoons containing the aluminum component and/or the silicon component as a pore former, it is possible to obtain the porous body having a high open porosity and a small thermal expansion coefficient.

DETAILED DESCRIPTION OF THE INVENTION

Figure 1A:
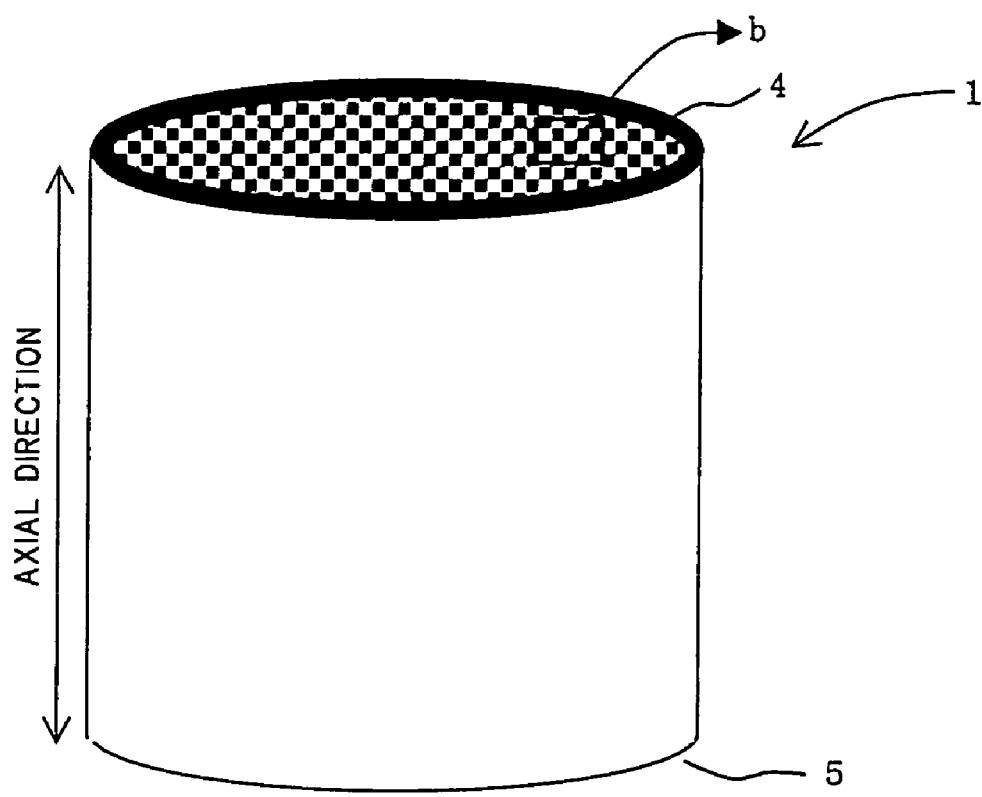
FIG. 1(a) is a schematic perspective view showing one embodiment of a porous body of the present invention.

A method of manufacturing a porous body according to the present invention will be described hereinafter in detail in accordance with an embodiment, but the present invention is not limited to these embodiments.

It is to be noted that in the present specification, the term "particle diameter" means a particle diameter measured by a laser diffraction/scattering type particle size distribution measuring device (e.g., trade name: LA-920 or the like manufactured by HORIBA, Ltd.). Moreover, the term "average particle diameter" means a particle diameter ($D_{50}$) in a point where an accumulated mass of particles is 50% of the total measured mass in a particle diameter distribution measured. For example, the particle diameter can be measured by a method of dispersing 1 g of particulate matter as a measurement object in 50 g of ion-exchange water by ultrasonic dispersion in a glass beaker, and diluting the resulting suspension at an appropriate concentration to inject the suspension into cells of the measuring device. Furthermore, after the ultrasonic dispersion is performed in the measuring device for two minutes, the particle diameter is measured.

In the present invention, when a raw material including an aluminum source and a titanium source is fired to manufacture the porous body containing aluminum titanate as a main component, inorganic microballoons which contain an aluminum component and/or a silicon component and which function as a pore former are used. This aspect will be described hereinafter in detail.

Aluminum Source

The aluminum source is a raw material which forms aluminum titanate together with the titanium source. The inorganic microballoons described later in detail may be used as the aluminum source. When the inorganic microballoons do not contain any aluminum component, however, another aluminum source is necessary. Even in the case where the inorganic microballoons contain an aluminum component and are used as the aluminum source, in consideration of maintaining a balance of a ratio between the aluminum component and titanium component forming aluminum titanate with respect to open porosity, it is usually preferable to add another aluminum source. As the other aluminum source, alumina ($Al_2O_3$) is preferred, and α-alumina is most preferable. It is preferable that the other aluminum source is alumina particles having particle diameters of 1 to 50 μm. It is further preferable that the alumina particles include 50 mass % or more, preferably 70 mass % or more of particles having particle diameters of 10 to 20 μm. In the case where aluminum titanate is formed using such alumina particles, the alumina particles function as aggregates, and aluminum titanate is formed as the titanium source is dissolved in the alumina particles, thereby forming pores which have excellent communicating properties and a comparatively small pore diameter distribution.

The total amount of the aluminum source is provided so that the amount of the aluminum component in the porous body is preferably 48 mass % or more, more preferably 50 to 55 mass % in terms of $Al_2O_3$. If the amount of the aluminum component in the porous body is excessively small, the fired article runs short of aluminum titanate crystals, and the desired thermal shock resistance cannot be obtained in some cases.

Titanium Source

There is not any special restriction on the titanium source, but from the viewpoint of availability and with respect to the ease of forming aluminum titanate, the titanium source is preferably titania ($TiO_2$). Examples of titania include rutile type, anatase type and brookite type, and any of those types may be used, but rutile type titania is preferable. The titanium source preferably has an average particle diameter of 0.5 to 10 μm, more preferably 0.5 to 5 μm. When a titanium source having such a particle diameter is used, aluminum titanate is easily formed through the above-described process, and pressure losses can further be reduced. As the titanium source having the above-described particle diameter distribution, from the viewpoint of the availability, titanium oxide is preferable which is usually used in a pigment or the like and which is manufactured by a sulfate process or a chlorine process.

The amount of titanium in the fired article is preferably 10 to 50 mass %, more preferably 30 to 45 mass % in terms of $TiO_2$. If the amount of titanium in the fired article is excessively small, the fired article runs short of aluminum titanate crystals, and the desired thermal shock resistance cannot be obtained in some cases. If the amount is excessively large, titanium oxide remains in the fired article, and the desired thermal shock resistance cannot be obtained in some cases.

Inorganic Microballoons

The inorganic microballoons are inorganic hollow particles containing the aluminum component and/or a silicon component, and which function as the pore former. When the inorganic microballoons contain the aluminum component, the aluminum component forms the aluminum source. That is, the aluminum component in the inorganic microballoons is fired to react with the titanium source, thereby forming aluminum titanate. In this case, hollow portions of the inorganic microballoons constitute pores, and it is possible to form an aluminum titanate porous body having a high open porosity.

When the inorganic microballoons contain the silicon component, the silicon component in the inorganic microballoons is fired to react with the aluminum source, and an aluminum titanate and mullite based porous body can be formed. That is, aluminum titanate constitutes aggregates, and the aggregates are bonded to one another by mullite as a binder, and this structure enhances strength of the porous body. Therefore, when the inorganic microballoons contain the silicon component, a porous body having a higher strength can be formed. Furthermore, when mullite is formed, the hollow portions of the inorganic microballoons constitute pores, and it is possible to form an aluminum titanate and mullite based porous body having a high open porosity.

It is to be noted that in a case where the aluminum titanate and mullite based porous body is formed, in addition to the inorganic microballoons, a material constituting a silicon source, such as silica glass, kaoline, mullite or quartz may be used. In this case, the inorganic microballoons do not have to contain any silicon source. When the inorganic microballoons contain both the aluminum component and the silicon component, the melting point tends to be lower, and easily falls into a preferable range of melting points in which satisfactory pores are formed as described later.

It is to be noted that in a case where the aluminum titanate and mullite based porous body is formed, it is preferable to blend raw materials so that the amounts of the titanium component, the aluminum component and the silicon component in the resultant porous body are 12 to 35 mass % of $TiO_2$, 48 to 78 mass % of $Al_2O_3$ and 5 to 25 mass % of $SiO_2$ in terms of $TiO_2$, $Al_2O_3$ and $SiO_2$, respectively, with respect to the whole porous body. It is further preferable to blend the raw materials so that the amount of $TiO_2$ is 14 to 33 mass %, the amount of $Al_2O_3$ is 53 to 74 mass %, and the amount of $SiO_2$ is 6 to 20 mass %.

There is not any special restriction on the type of the inorganic microballoons as long as the inorganic microballoons are hollow articles containing an aluminum component as the aluminum source which is fired to form aluminum titanate and/or a silicon component as the silicon source which is fired to form mullite. Typical examples of the inorganic microballoons include fly ash balloons, alumina balloons, glass balloons, Shirasu balloons, and silica balloons. The inorganic microballoons containing both an aluminum component and a silicon component are preferably $Al_2O_3$—$SiO_2$-based balloons, and typical examples of such balloons include fly ash balloons, Shirasu balloons and glass balloons, and the fly ash balloons or the Shirasu balloons are especially preferable.

The total content of the silicon component in terms of $SiO_2$ and the aluminum component in terms of $Al_2O_3$ in the inorganic microballoons is preferably 80 mass % or more, further preferably 85 mass % or more, especially preferably 87 mass % or more. If the total content of the silicon component and the aluminum component is less than 80 mass %, the softening temperature of the inorganic microballoons unfavorably tends to be excessively low.

It is also preferable that the inorganic microballoons contain a sodium component and/or a potassium component. When the inorganic microballoons contain an appropriate amount of an alkali source, the melting point of the inorganic microballoons can appropriately be lowered. When an appropriate amount of a glass phase is formed in the resultant aluminum titanate based porous body, the strength of the porous body can be enhanced.

The total content of the sodium component in terms of $Na_2O$ and the potassium component in terms of $K_2O$ in the inorganic microballoons is preferably 0.5 mass % or more, further preferably 1 mass % or more, especially preferably 2 mass % or more. If the total content of the sodium component and the potassium component is excessively small, it is not sufficiently easy to obtain the effect of lowering the melting point of the inorganic microballoons and the effect of enhancing the strength of the porous body. On the other hand, the total content is preferably 8 mass % or less, further preferably 6 mass % or less. If the total content of the sodium component and the potassium component is excessively large, the melting point of the inorganic microballoons becomes excessively low, and the effect of enhancing the strength of the porous body cannot sufficiently easily be obtained.

The melting point of the inorganic microballoons is preferably 1100° C. or more, more preferably 1200° C. or more. If the melting point of the inorganic microballoons is excessively low, there is a tendency for the microballoons to melt, allowing the pores to contract before aluminum titanate is formed. Thus, unfavorably, the pore forming effect is not easily achieved. On the other hand, the melting point of the inorganic microballoons is preferably 1600° C. or less, more preferably 1400° C. or less, especially preferably 1350° C. or less. If the melting point of the inorganic microballoons is excessively high, shells of the inorganic microballoons tend to fail to open at the firing temperature, and pore diameters tend to be reduced.

The moisture content of the inorganic microballoons is preferably 0.1 mass % or less, more preferably 0.08 mass % or less. When the inorganic microballoons having a moisture content above 0.1 mass % are used, defects are sometimes generated in the aluminum titanate based porous body obtained by rupturing the article due to volume expansion during the firing. When the aluminum titanate based porous body is used as a filter, the trapping efficiency of the filter might drop unfavorably.

Since the method of manufacturing the inorganic microballoons including the fly ash balloons usually includes a water elutriation step, moisture sometimes remains in the micro pores. Therefore, to reduce a remaining moisture amount, in the present invention, it is preferable to use inorganic microballoons that are calcined at 300° C. or more, and it is more preferable to use inorganic microballoons that are calcined at 320° C. or more.

There is not any special restriction on the average particle diameter of the inorganic microballoons, but in the case where a honeycomb porous body is manufactured in which partition walls have a thickness of 300 μm or less, the average particle diameter is preferably 100 μm or less. This average particle diameter is a value measured by laser scattering type particle size distribution measurement. It is also preferable that a crushing strength of the inorganic microballoons for use in the present invention, measured by a micro compression tester, is 1 MPa or more, because the balloons are not easily crushed during kneading. The crushing strength is more preferably 5 MPa or more. This crushing strength refers to a value which is measured using the micro compression tester and which is calculated assuming that the inorganic microballoons are solid balls. Furthermore, the tap density of the inorganic microballoons is preferably 0.5 g/cm$^3$ or less, more preferably 0.41 g/cm$^3$ or less. The thickness of the shell of the inorganic microballoon is preferably 10 μm or less, more preferably 5 μm or less. It is to be noted that the thickness of the shell is a value measured by observing a broken or polished surface of the shell with a microscope.

There is not any special restriction on the amount of the inorganic microballoons to be added, but if the added amount of the inorganic microballoons is excessively small, an effect of increasing the open porosity is excessively reduced. If the added amount is excessively large, the total amount of aluminum titanate in the fired article is reduced, and a thermal expansion coefficient increases. The added amount of the inorganic microballoons is preferably 5 to 40 mass %, more preferably 10 to 35 mass %, especially preferably 15 to 25 mass % with respect to the total of the raw materials constituting the aluminum source and the titanium source and the inorganic microballoons.

Other Inorganic Components

In the case where the aluminum titanate based porous body is formed, when another inorganic component is contained, the stability of aluminum titanate can be enhanced. Examples of other inorganic components that are present in the aluminum titanate based porous body and that can enhance the stability of aluminum titanate include an $Fe_2O_3$ component, an MgO component and a CaO component, and it is preferred that at least one of those is contained in the aluminum titanate based porous body. However, if an excessively large amount of these components is contained, the thermal expansion coefficient tends to increase. It is preferred that the $Fe_2O_3$ component is present in the aluminum titanate based porous body in a range of 0.05 to 5 mass %. It is preferred that the MgO component is present in the aluminum titanate based porous body in a range of 0.01 to 10 mass %. It is preferred that the CaO component is present in the aluminum titanate based porous body in a range of 0.01 to 10 mass %. Such inorganic components are contained in the above-described raw material in some cases. In this case, it is preferable to adjust the type and the amount of the raw material so that each component of the aluminum titanate based porous body falls in the above-described range. It is especially preferable that the inorganic microballoons contain at least one component selected from the group consisting of an iron component, a magnesium component and a calcium component in an amount indicated in the above-described range. Alternatively, in addition to the inorganic microballoons, the raw material containing at least one selected from the group consisting of the iron component, the magnesium component and the calcium component may be used.

Process of Manufacturing Porous Body

To the above-described inorganic raw material, an organic auxiliary agent component and a dispersion medium are added, mixed and kneaded to prepare the raw material to be fired. Usually, after molding this raw material to be fired into a predetermined shape, for example, a molded article having a honeycomb structure, the article can be fired to obtain the porous body containing aluminum titanate as the main component.

Organic Auxiliary Agent Component

Examples of the organic auxiliary agent component include the pore former, the binder and a dispersant. Although the inorganic microballoons function as the pore former, another pore former may be used together with the inorganic microballoons. Examples of other pore formers include graphite, foamed resin, flour, starch, phenol resin, polymethyl methacrylate, polyethylene and polyethylene terephthalate.

Examples of the binder include hydroxypropyl methylcellulose, methylcellulose, hydroxyethyl cellulose, carboxyl methylcellulose and polyvinyl alcohol. Examples of the dispersant include ethylene glycol, dextrin, fatty acid soap and polyalcohol.

Dispersion Medium

Examples of the dispersion medium in which the above-described components are dispersed include water and wax. Above all, water is preferable because a volume change is small during drying, little gas is generated, and the water is thus easy to handle.

A blend ratio of the components, for example, with respect to 100 parts by mass of the inorganic raw material, can be set to 0 to 50 parts by mass of pore former and 10 to 40 parts by mass of dispersion medium (e.g., water), and, if necessary, 3 to 5 parts by mass of binder or 0.5 to 2 parts by pass of dispersant.

Examples of a device for mixing and kneading these components include a combination of a kneader and an extruder and a continuous kneading extruder. As a method of molding the material into a predetermined shape, it is possible to perform an extrusion molding method, an injection molding method, a press molding method, a method of forming through holes after molding a ceramic material into a columnar shape or the like. Above all, it is preferable to perform the extrusion molding method in that continuous molding is easy.

Subsequently, it is preferable to dry the resultant molded article. The molded article can be dried by hot-air drying, microwave drying, dielectric drying, reduced-pressure drying, vacuum drying, freeze drying or the like. Above all, it is preferable to perform a drying step in which the hot-air drying is combined with the microwave drying or the dielectric drying in that the whole article can quickly and uniformly be dried.

Subsequently, the dried molded article is fired. Examples of a firing method include a method in which the article is fired using a device such as an electric furnace under the conditions that the maximum firing temperature is 1500 to 1700° C., the time for retaining the maximum firing temperature is 0.5 to 10 hours, and the firing atmosphere is the atmosphere or the like.

Figure 1B:
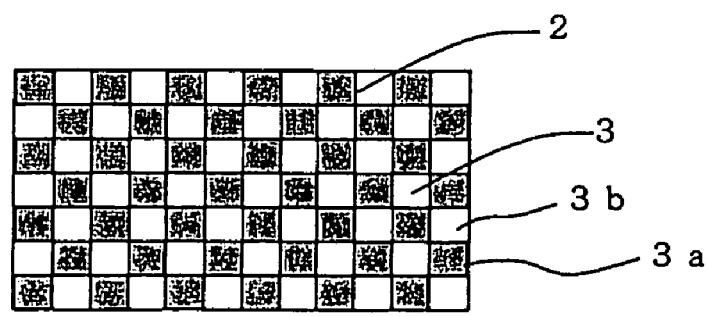
FIG. 1(b) is a partially enlarged view of part b of FIG. 1(a).

For example, to obtain the honeycomb structure for use in a catalyst carrier for treatment of an exhaust gas, a diesel particulate filter or the like, as shown in FIGS. 1A and 1B, there is molded a molded article in which cells 3 extending from an end face 4 to an end face 5 in an axial direction are formed by partition walls 2, and this article is dried and then fired. In a case where a honeycomb structure 1 is used in a filter such as the diesel particulate filter, openings of predetermined cells 3a and 3b are plugged in either of the end faces 4 and 5. A plugging step can be performed by: adding the dispersion medium, the binder or the like to a predetermined material such as an aluminum titanate powder to obtain a slurry state; disposing this material so as to close predetermined cell openings; and drying and/or firing the material. In the plugging step, the end face of each predetermined cell is plugged so as to form a checkered pattern. The step is preferably performed so that end portions of adjacent cells are alternately plugged on each side. The plugging step may be performed in any stage after a molding step. If the plugging requires firing, the plugging is preferably performed prior to a firing step, because the firing may be performed once.

EXAMPLES

The present invention will be described hereinafter in more detail in accordance with examples, but the present invention is not limited to these examples.

Example 1

As an aluminum source, alumina ($Al_2O_3$) particles having an average particle diameter of 15 μm were used. As a titanium source, titania ($TiO_2$) particles having an average particle diameter of 4 μm were used. As inorganic microballoons, there were used fly ash balloons having a chemical composition shown in Table 1, an average particle diameter of 58 μm and a melting point of 1600° C. With respect to the total of the alumina particles, the titania particles and the fly ash balloons, 20 mass % of fly ash balloons were blended. The alumina particles and the titania particles were blended so that the amounts of an aluminum component, a titanium component and a silicon component in the resultant porous body were about 65 mass %, about 21 mass % and about 13 mass % in terms of $Al_2O_3$, $TiO_2$ and $SiO_2$, respectively. Furthermore, with respect to 100 parts by mass of the alumina particles, the titania particles and the fly ash balloons in total, 2 parts by mass of methyl cellulose, 2 parts by mass of hydroxypropoxy methylcellulose, 0.5 part by mass of fatty acid soap as a surfactant and an appropriate amount of water were added, mixed and kneaded to obtain clay. This clay was extruded and molded into a honeycomb structure, and moisture was removed by dielectric drying and hot-air drying. Thereafter, the resultant article was fired in the atmosphere on conditions that the maximum temperature was 1500° C. and a time for retaining the maximum temperature was eight hours, thereby obtaining a porous body having the honeycomb structure.

Examples 2 to 12

Porous body were obtained in the same manner as in Example 1, except that inorganic microballoons shown in Table 1 were used by amounts shown in Table 1, and alumina particles and titania particles were blended so that amounts of an aluminum component, a titanium component and a silicon component in the resultant porous body indicated ratios shown in Table 1 in terms of $Al_2O_3$, $TiO_2$ and $SiO_2$, respectively.

Comparative Example 1

A porous body was obtained in the same manner as in Example 1 except that instead of inorganic microballoons, quartz ($SiO_2$) particles having an average particle diameter of 5 μm, alumina ($Al_2O_3$) particles having an average particle diameter of 15 μm, titania ($TiO_2$) particles having an average particle diameter of 4 μm and a reagent as another oxide were used and blended so as to obtain the same composition as that of the inorganic microballoons of Example 1 as shown in Table 1, and alumina particles and titania particles were blended so that amounts of an aluminum component, a titanium component and a silicon component in the resultant porous body indicated ratios shown in Table 1 in terms of $Al_2O_3$, $TiO_2$ and $SiO_2$, respectively.

Open Porosity:

Using the Archimedes process by immersion in water, an in-water weight (M2g), a saturated water weight (M3g) and a dry weight (M1g) were measured by a method in conformity to JIS R1634, and the open porosity was calculated by the following equation:

$$\text{Open porosity (\%)} = 100 \times (M3 - M1)/(M3 - M2)$$

Median Pore Diameter:

The median pore diameter was measured using a mercury porosimeter (Pore Master-60-GT manufactured by QUANTACHROME Co.) by mercury porosimetry.

A-Axis Direction Thermal Expansion Coefficient:

The thermal expansion coefficient was measured using a sample cut out of a honeycomb structure, assuming that an A-axis direction was a measurement direction, and using quartz as a standard sample by a differential measurement method.

In the present invention, the "A-axis direction" means a direction parallel to a channel of the honeycomb structure as defined in JASO M505-87 (Method of Testing Ceramic Monolith Carrier for Automobile Exhaust Gas Purification Catalyst). A "B-axis direction" means a direction vertical to the A-axis direction and a partition wall surface.

TABLE 1

| | Inorganic micro balloons Properties | | | | | | | | | |
|---|---|---|---|---|---|---|---|---|---|---|
| | SiO₂ Mass % | Al₂O₃ Mass % | Fe₂O₃ Mass % | TiO₂ Mass % | CaO Mass % | MgO Mass % | K₂O Mass % | Na₂O Mass % | K₂O + Na₂O Mass % | Particle diameter μm |
| Example 1 | 63 | 34 | 0.4 | 1.3 | 0.1 | 0.2 | 0.4 | 0.1 | 0.5 | 58 |
| Example 2 | 56 | 36 | 2 | 1.1 | 1.5 | 0.4 | 0.9 | 0.5 | 1.4 | 48 |
| Example 3 | 65 | 27 | 2.1 | 0.7 | 0.4 | 0.8 | 2.1 | 0.7 | 2.8 | 78 |
| Example 4 | 55 | 37 | 1.7 | 1 | 0.8 | 0.5 | 1.5 | 0.4 | 1.9 | 96 |
| Example 5 | 54 | 32 | 3.7 | 0.8 | 0.4 | 1.5 | 4.6 | 1.1 | 5.7 | 58 |
| Example 6 | 76 | 13 | 1.9 | — | 2.4 | 0.5 | 1.6 | 2.9 | 4.5 | 20 |
| Example 7 | 74 | 13 | 1.4 | — | 0.8 | 0.2 | 4.5 | 2.8 | 7.2 | 25 |
| Example 8 | 63 | 34 | 0.4 | 1.3 | 0.1 | 0.2 | 0.4 | 0.1 | 0.5 | 58 |
| Example 9 | 63 | 34 | 0.4 | 1.3 | 0.1 | 0.2 | 0.4 | 0.1 | 0.5 | 58 |
| Example 10 | 63 | 34 | 0.4 | 1.3 | 0.1 | 0.2 | 0.4 | 0.1 | 0.5 | 58 |
| Example 11 | 62 | 35 | 0.3 | 1 | 0.1 | 0.2 | 0.3 | 0.1 | 0.4 | 63 |
| Example 12 | 54 | 22 | 3.7 | 0.8 | 0.4 | 1.5 | 5.1 | 3.1 | 8.2 | 55 |
| Comparative Example 1 | — | — | — | — | — | — | — | — | — | — |

| | Inorganic micro balloons | | Aluminum titanate and mullite based porous body | | | | | |
|---|---|---|---|---|---|---|---|---|
| | Properties Melting point °C. | Added amount Mass % | Chemical composition | | | Open porosity [%] | A-axis direction thermal expansion coefficient [ppm/K] | Median pore diameter [μm] |
| | | | Al₂O₃ Mass % | TiO₂ Mass % | SiO₂ Mass % | | | |
| Example 1 | 1600 | 20 | 65 | 21 | 13 | 55 | 1 | 16 |
| Example 2 | 1400 | 20 | 65 | 22 | 10 | 54 | 1.3 | 17 |
| Example 3 | 1300 | 20 | 64 | 21 | 13 | 53 | 1.2 | 28 |
| Example 4 | 1400 | 20 | 63 | 24 | 11 | 51 | 1.2 | 18 |
| Example 5 | 1200 | 20 | 62 | 24 | 11 | 47 | 1.1 | 24 |
| Example 6 | 1100 | 20 | 64 | 18 | 15 | 48 | 1.2 | 23 |
| Example 7 | 1100 | 20 | 64 | 18 | 15 | 48 | 1.5 | 22 |
| Example 8 | 1600 | 15 | 64 | 26 | 10 | 48 | 1.4 | 18 |
| Example 9 | 1600 | 33 | 68 | 10 | 21 | 58 | 1.5 | 21 |
| Example 10 | 1600 | 35 | 69 | 8 | 22 | 59 | 2 | 14 |
| Example 11 | 1600 | 20 | 66 | 21 | 12 | 59 | 1 | 12 |
| Example 12 | 1000 | 20 | 64 | 23 | 10 | 45 | 2 | 9 |
| Comparative Example 1 | — | 0 | 65 | 21 | 13 | 41 | 1 | 11 |

Table 1 shows that the porous bodies obtained in Examples 1 to 12 have large open porosities as compared with the porous body obtained in Comparative Example 1. In the porous body obtained in Example 12 using the inorganic microballoons containing 8.2 mass % of $K_2O$ and $Na_2O$ in total, the open porosity and the median pore diameter are small as compared with the other examples in which the total content of $K_2O$ and $Na_2O$ is 6 mass % or less, but the open porosity is large as compared with the comparative example. In the porous body obtained in Example 11 using the inorganic microballoons containing 0.4 mass % of $K_2O$ and $Na_2O$ in total, the average pore diameter is small as compared with the porous bodies obtained in the other examples in which the total content of $K_2O$ and $Na_2O$ is 0.5 mass % or more. In the porous body obtained in Example 10 in which the added amount of the inorganic microballoons is 35 mass %, the thermal expansion coefficient is large as compared with the other examples.

A method of manufacturing a porous body of the present invention is capable of manufacturing the porous body having a high open porosity and a small thermal expansion coefficient, and the method is preferably usable in manufacturing a filter such as a diesel particulate filter or a catalyst carrier.

What is claimed is:

1. A method of manufacturing a porous body, comprising firing a raw material including an aluminum source and a titanium source to obtain the porous body containing aluminum titanate as a main component;
   wherein the raw material includes inorganic microballoons containing at least one of an aluminum component and a silicon component, and a total content of the aluminum component and the silicon component in the inorganic microballoons is 90 mass % or more in terms of $Al_2O_3$ and $SiO_2$, respectively; and
   wherein the inorganic microballoons contain at least one of a sodium component and a potassium component, wherein a total content of the sodium component and the potassium component in the inorganic microballoons is more than 2.0 mass % up to and including 8.0 mass % in terms of $Na_2O$ and $K_2O$, respectively, and wherein a melting point of the inorganic microballoons is in a range of 1100° C. to 1350° C.

* * * * *